March 12, 1957  J. A. HUMBLE ET AL  2,784,588
LINEARITY SPRING TESTERS
Filed Oct. 20, 1954
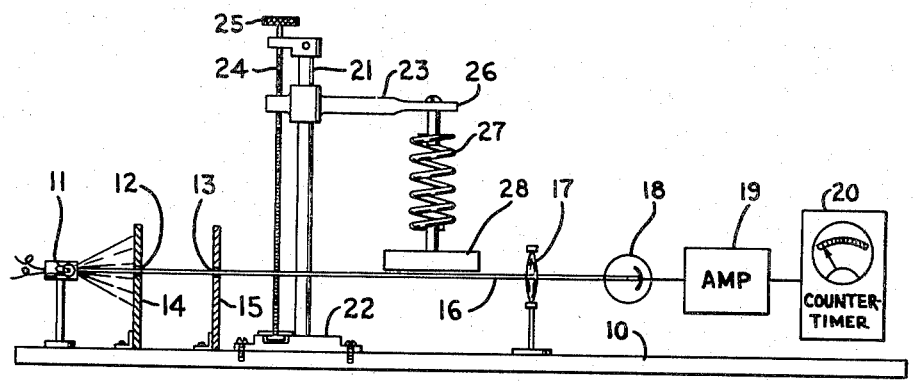
FIG. 1
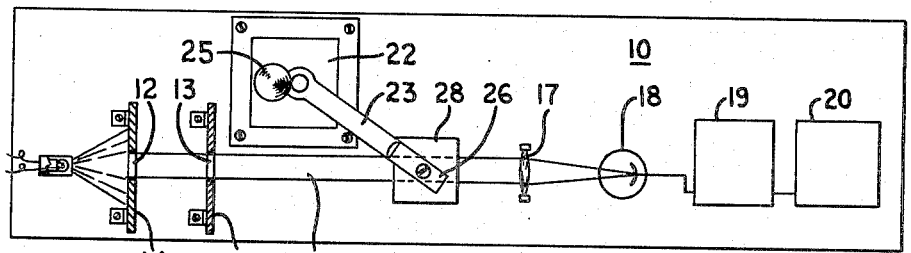
FIG. 2
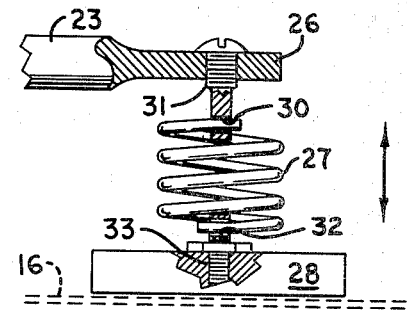
FIG. 3
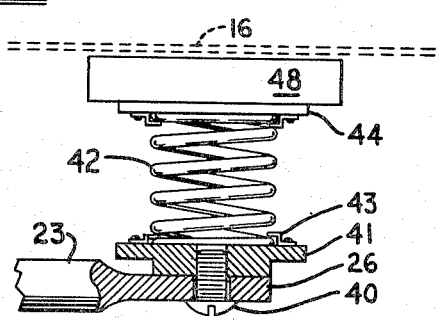
FIG. 4
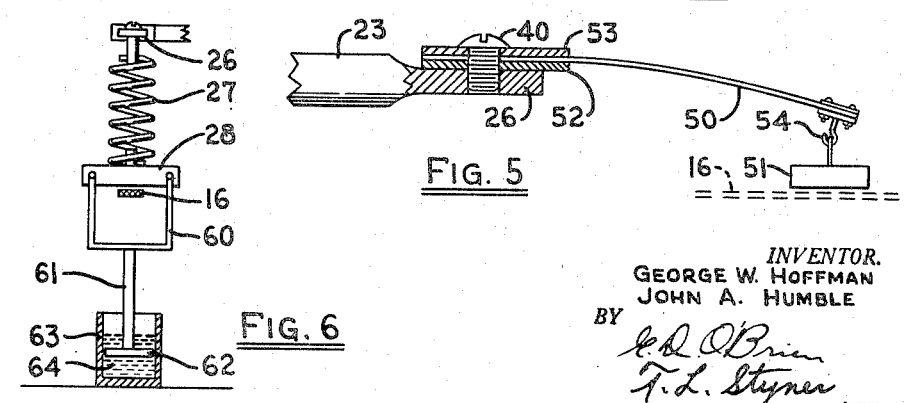
FIG. 5
FIG. 6
*INVENTOR.*
GEORGE W. HOFFMAN
JOHN A. HUMBLE
BY
*C. D. O'Brien*
*F. L. Styner*
ATTYS.

United States Patent Office 2,784,588
Patented Mar. 12, 1957

2,784,588

LINEARITY SPRING TESTERS

John A. Humble and George William Hoffman,
Indianapolis, Ind.

Application October 20, 1954, Serial No. 463,632

1 Claim. (Cl. 73—161)

(Granted under Title 35, U. S. Code (1952), sec. 266)

The invention described herein may be manufactured and used by or for the Government of the United States of America for governmental purposes without the payment of any royalties thereon or therefor.

The present invention relates to a spring tester and more particularly to electronic spring tester devices for very accurately determining the spring frequency and rate and the deviations from linearity resulting from various load deflections whereby the spring characteristics and properties may be classified for precision springs.

Known means and methods of determining spring characteristics and properties involve loading the spring being tested with various weights, either directly or by means of a balance, and measuring the spring deflection for each load by dial indicator and/or micrometric mechanisms. In practice such known devices have proved unsuitable in instances where extreme accuracy is required. The need for greater accuracy arose in connection with the testing of springs for use in air pressure responsive devices in which the springs are used in matched pairs. To insure the required overall accuracy of the device these springs must be matched for linearity of response within very close tolerances for widely varying load conditions. In performing tests of springs for these purposes utilizing known spring testers it was found that the required accuracy for matching and classifying springs could not be obtained. Repetition of the spring tests on the known spring testers of a single spring specimen gives inconsistent results for the reason on the most part that the inherent friction in the balances, levers, gears, etc. of the known testers gives varying or different errors.

In the present invention these errors are avoided and the accuracy of spring testing is advanced such that springs can be matched and classified for precision use. In this invention the specimen spring is supported by one of its ends and the opposite end is loaded well within the range of its elastic limits. The spring is then actuated to vibrate freely at its resonant frequency. The weighted end of the spring is vibrated normally across the path of a collimated light beam to produce interruptions in the light beam. The light beam is picked up by a photoelectric cell the interrupted output of which is amplified and coupled to a counter-timer circuit of well known design and function to provide a visual or recorded indication of the vibration period under various spring loads. These indications readily provide information as to the linearity characteristics of the specimen spring. It is therefore a general object of this invention to provide a means for freely vibrating a resilient element or of vibrating the element under fluid control under various conditions of load and transforming those vibrations into electrical pulses which are passed through electrical counter-timer recording means to present the frequency and linearity characteristics of the resilient element or fluid.

Other objects and many attendant advantages of the invention will be readily appreciated as the same becomes better understood by reference to the following detailed description when considered in connection with the accompanying drawing, in which:

Fig. 1 is a side elevational schematic view of a combination of the invention;

Fig. 2 is a partial top view of the schematic shown in Fig. 1;

Fig. 3 is an enlarged view, partly in section, of the spring supporting means;

Fig. 4 is an enlarged view of a modification of a spring supporting means to adapt the invention for analyzing compression springs;

Fig. 5 is an enlarged view of a modification showing the support arrangement for leaf springs; and Fig. 6 is a modified partial view of the spring weight means with dashpot damping means thereon.

Referring more particularly to Figs. 1, 2, and 3 wherein like reference characters refer to like parts in the several views, a supporting base or surface 10 has the combination mounted thereon. A light source, as an incandescent bulb 11, is supported above the base 10 with the light hooded or shielded in a well known manner to be directed through horizontally elongated and aligned slots 12 and 13 in a pair of spaced apart upstanding plates 14 and 15, respectively. The aligned slots 12 and 13 allow substantially parallel rays to pass through the plates which substantially collimate the light rays in a thin flat plane to form the light beam generally referred to by 16. A collimating lens system may well be used in substitution for the spaced slotted plates 14 and 15, where desired. The light beam 16 passes through a convergent or collecting lens 17 to bring the light rays to a focus on the light sensitive element of a photoelectric cell 18. The output of the cell 18 is coupled to a conventional direct current (D. C.) amplifier 19 which amplifies the D. C. signal to drive a counter-timer 20 of any well known type which is capable of counting D. C. variations in accordance with predetermined time periods. Such counters and timers are well known and may be purchased on the commercial market, as for example, the Universal Counter and Timer Model 5510 of Beckman Instruments, Inc. The vibrations of the spring could also be changed to electrical signals by crystal means or other electro-mechanical means, where desired.

Near the light beam 16 between the plate 15 and the collector lens 17 is an upstanding support 21 held by a base portion 22 on which is slidable a lateral arm 23. The vertical height of the arm 23 is adjustable by a screw-threaded rod 24 swiveled in the base portion 22 and threaded through a portion of the arm 23. The rod has a knurled knob 25 on the top thereof to facilitate adjustment. The outer end portion 26 of the arm 23 supports one end of a resilient element, herein illustrated as a tension spring 27 to be analyzed. The lower end of spring 27 supports a weight 28 which is not so heavy as to exceed the elastic limit of the spring. The rod 24 is adjusted so that the weight, in the static condition, rests just above the flat light beam 16. Up and down vibratory motion of the weight 28 freely suspended by the spring 27 will cause interruptions of the light beam producing a square wave output from the cell 18. These pulses are counted with respect to time and to give one test characteristic of the spring 27. Different weights 28 are attached to the spring 27 and the frequency of vibration counted. If the frequency-to-weight ratio is the same for several different selected weights the spring will have a linear function and two or more springs can thus be matched in their linear load-extension characteristics.

As more particularly shown in Fig. 3, the tension spring 27 is attached at the top end by having the end thereof to pass through an eyelet 30 of a cap screw 31 threaded into the arm portion 26. The lower end of the spring 27 has the end portion thereof passed through an eyelet 32 of a threaded shaft 33 which is threaded into a socket of a weight 28. The ends of a tension spring are normally turned through the diametrical centerline of the coils or hooked so that they may readily be attached in the eyelets, as shown, although any suitable means of attaching the spring ends may be used.

Where it is desirable to analyze compression elements as rubber, springs, or the like, a spring being illustrated, the spring and weight may be mounted as illustrated in Fig. 4. The end portion 26 of the arm 23 may have a clean bore through which a cap screw 40 is passed and threaded upwardly into a collar support 41. The lower end of a compression spring 42 rests on the flat top surface of the collar 41 and is held against lateral slip by three or more angle brackets 43 detachably secured to the collar 41. An upper spring plate 44 rests on the upper end of the spring 42 and is retained against lateral slip by brackets in the same manner as the collar 41. Masses 48 of different weight can be placed on the upper plate 44, as desired. In the operation of analyzing compression springs, the rod 24 is rotated in the appropriate direction to position the weight 48 at static rest just below the plane of the light beam so that vibrations of the spring will cause the light beam to be interrupted periodically.

As illustrated in Fig. 5, resilient elements as leaf springs may be analyzed by attaching one end of the leaf spring, as 50, to the end portion 26 of the arm 23 in any suitable manner and by applying a weight 51 to the other end. The fastening of the end of the leaf spring 50 may be accomplished by threading the cap screw 40 downwardly through a pair of clamping plates 52 and 53 to clamp one end of the leaf spring 50 therein in cantilever fashion. The opposite end of the leaf spring 50 may have a hook means 54 clamped thereon to which the weight 51 may be attached. The weight 51 can then be adjustably suspended just above the plane of the light beam 16 as described for the other modification and the linearity characteristics checked as before.

While the invention has for its primary purpose the means to analyze the linearity characteristics of resilient elements, it also finds application in analyzing dampening fluids using a standard spring. As more particularly illustrated in Fig. 6, the weight 28, of Fig. 1, may have a U-shaped bracket 60 attached to the underside thereof with a central depending shaft 61 supporting a piston 62 on the lower end thereof. The piston loosely fits into a cylindrical well 63 containing a fluid 64 which dampens the vibrations of the spring 27. The spring used in this illustration is preferably one of known characteristics wherein the dampening characteristics of the fluid 64 may be determined.

The operation of the device illustrating the invention is believed to be apparent from the above description; however, to obtain the most accurate analysis several masses of different weight should be used in the test analysis of each resilient element to determine the linearity of the load extension characteristics. The height of the arm 23 can be adjusted for each weight so that the weight, in its static condition, will just clear the light beam. The photoelectric cell 18 will have a constant D.-C. voltage output under these conditions. When the resilient element is started to vibrate, as by manually initiating an up and down motion in the weight, the weight will interrupt the light beam causing a square wave voltage output of the cell 18, the peaks representing the uninterrupted light beam and the valleys representing the interrupted light beam. The unit 20 counts the vibrations of the resilient element as represented by the voltage wave with respect to units of time, these indicated readings being taken for each weight. If the ratio of the weight to frequency remains substantially constant, the resilient element will be said to have substantially a linear function under load. Other resilient elements can be so matched in linear characteristics and these analyses can be repeated since there are no factors of friction or resistance to consider. Such analysis can be carried out for any type of resilient element by merely adapting the support and weight connection for the particular resilient element to be tested, examples of three types of elements being described herein for springs by way of example.

The characteristics of dampening or dashpot fluids can likewise be determined by the modification illustrated in Fig. 6 utilizing a resilient element as a spring of known characteristics whereby fluids may be matched for matched dashpots or the like.

While we have illustrated preferred embodiments of our invention it is to be understood that many modifications and changes may be made in the constructional details and features of the invention without departing from the spirit and scope of the invention in the practice thereof and we desire to be limited only in the scope of the appended claim.

We claim:

A device for analyzing the linearity load-extension characteristics of coil springs comprising; a source of light; means collimating said light into a light beam of rectangular cross-section lying in a horizontal plane; a collector lens and a photoelectric cell in the path of said light beam, said collector lens condensing said rectangular beam to a point on said photoelectric cell; a counter-timer electrically coupled to said photoelectric cell; a stand out of the path of said light beam, said stand having a non-rotatable vertically adjustable arm thereon with means on said arm for holding one end of a spring to be analyzed, said non-rotatable vertically adjustable arm being adaptable to position the longitudinal axis of said spring perpendicular to said light beam; and selective weights having means thereon for attachment to the free end of the spring to be tested whereby said spring may vibrate freely at its resonant frequency, said selected weight being positioned adjacent said rectangular beam in the static condition by said vertically adjustable arm to interrupt said light beam periodically in the vibratory condition of said spring to produce a frequency registration by said counter-timer indication of the spring characteristics for the selected weights.

References Cited in the file of this patent

UNITED STATES PATENTS

| | | |
|---|---|---|
| 989,958 | Frahm | Apr. 18, 1911 |
| 1,029,608 | Hamm | June 18, 1912 |
| 1,565,596 | Snook | Dec. 15, 1925 |
| 1,635,787 | Hort | July 12, 1927 |
| 2,301,396 | Graf | Nov. 10, 1942 |
| 2,367,126 | James | Jan. 9, 1945 |
| 2,423,985 | Kohlhagen | July 15, 1947 |
| 2,584,562 | Dostal | Feb. 5, 1952 |
| 2,609,680 | Caldwell | Sept. 9, 1952 |